US004001780B2

United States Statutory Invention Registration [19]

[11] Reg. Number: H1780

Melega [45] Published: Feb. 2, 1999

[54] SOIL SAMPLE CORE SYSTEM

[75] Inventor: James L. Melega, Spring Valley, Calif.

[73] Assignee: The United States of America as represented by the Secretary of the Navy, Washington, D.C.

[21] Appl. No.: 730,918

[22] Filed: Oct. 2, 1996

[51] Int. Cl.[6] ..... E21B 49/02

[52] U.S. Cl. ..... 175/20; 175/58

[58] Field of Search ..... 73/864.44, 864.45; 175/58, 20

[56] References Cited

U.S. PATENT DOCUMENTS

| | | | |
|---|---|---|---|
| 2,987,922 | 6/1961 | Harrington . | |
| 3,273,930 | 9/1966 | Gottfried . | |
| 3,326,049 | 6/1967 | Eley . | |
| 3,367,188 | 2/1968 | Robinson . | |
| 3,444,938 | 5/1969 | Ballmann . | |
| 3,978,733 | 9/1976 | Avot . | |
| 3,986,555 | 10/1976 | Robertson | 166/246 |
| 4,336,849 | 6/1982 | Hug | 73/864.45 |
| 4,653,336 | 3/1987 | Vollweiler | 73/864.44 |
| 5,186,263 | 2/1993 | Kejr et al. | 175/20 |
| 5,245,878 | 9/1993 | Underwood . | |
| 5,474,140 | 12/1995 | Stevens | 175/20 |
| 5,505,098 | 4/1996 | Turriff et al. | 73/864.44 |

FOREIGN PATENT DOCUMENTS

| | | | |
|---|---|---|---|
| 3820924 | 12/1989 | Germany | 73/864.45 |

*Primary Examiner*—Bernarr E. Gregory
*Attorney, Agent, or Firm*—Harvey Fendelman; Michael A. Kagan; Peter A. Lipovsky

[57] ABSTRACT

A soil sample core system includes an outer cylinder having first and second ends; a sample tube for sliding within the outer cylinder; a tip sleeve mounted to the first end of the outer cylinder; a push pipe which may be mounted to the second end of the outer cylinder to prevent the sample tube from sliding out of the second end; a tapered tip which may be selectively extended out of the tip sleeve and which may be selectively retracted into the push pipe; an end cap having a threaded bore which may be mounted to the second end of the outer cylinder in place of the push pipe; a threaded shaft threaded in the threaded bore; a piston rotatively mounted to one end of the threaded shaft for sliding within the outer cylinder; and a torque transmitting element mounted to the other end of the threaded shaft for transferring torque to thread the shaft through the threaded aperture.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

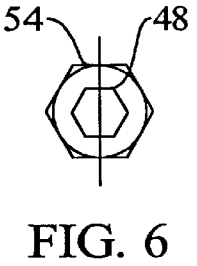
FIG. 6
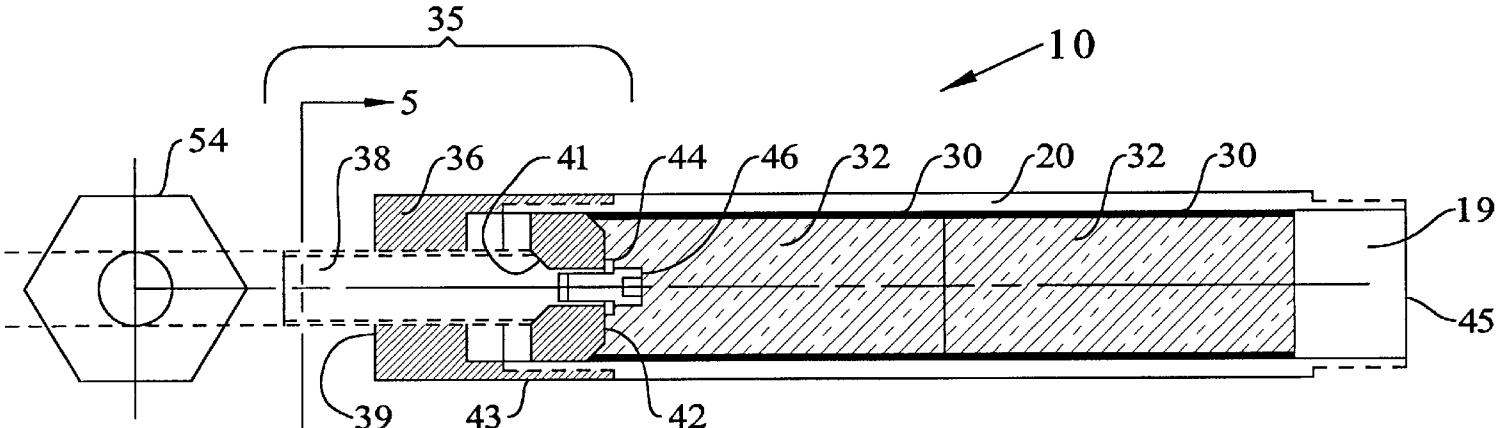
FIG. 3
FIG. 5
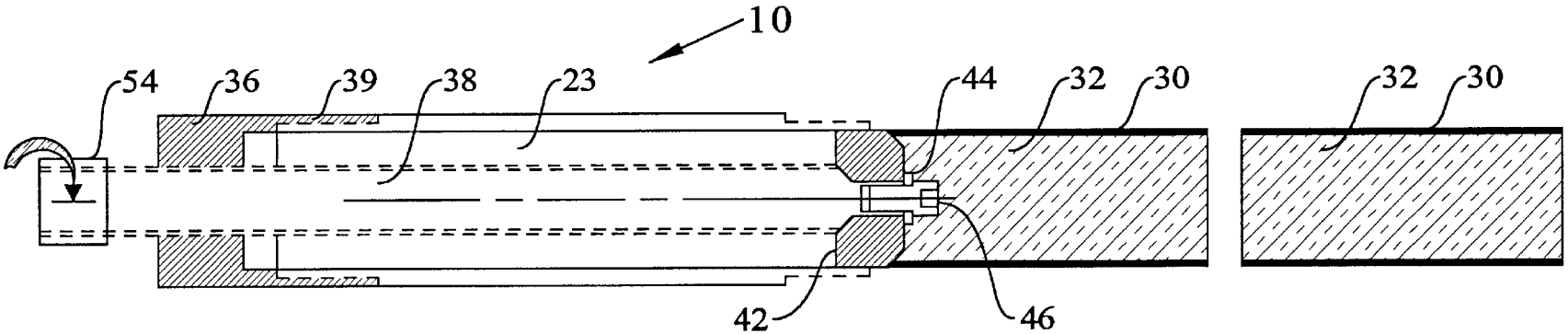
FIG. 7

SOIL SAMPLE CORE SYSTEM

BACKGROUND OF THE INVENTION

The present invention generally relates to the field of ground soil coring equipment, and more particularly, to a soil sample core system in which a screw driven rotatable piston is used to drive a soil sample tube out of the system without disturbing the soil sample.

Many commercially available soil sampling tools usually consist of an outer cylinder and one or more serially stacked inner cylinders that fit within the outer cylinder. The tools are pushed into the ground by various means. The soil sample is collected inside the inner cylinder(s) which are usually thin wall tubes. The outer cylinder is relatively thick walled and acts as the strength member to which force is applied to push the tool through the soil. The inner tubes may also be "split" tubes, so that the tube can be "peeled" away from the soil sample.

A problem with soil sampling tools is that soil is also collected in the annulus formed between the outer and inner cylinders. If the soil is dense, abrasive, and compacted within the annulus, the inner tubes may become lodged or jammed so that they cannot easily be removed from the outer cylinder without disturbing the soil samples. When this happens, the jammed tubes need to be "hammered" out of the outer cylinder. However, such hammering generally disturbs, and in some cases destroys, the soil sample.

Therefore, a need exists for a tool for collecting soil samples which allows the soil samples to be removed without being disturbed.

SUMMARY OF THE INVENTION

The present invention provides a soil sample core system for collecting soil samples which allows the soil samples to be removed from the tool without being disturbed. A soil sample core system comprises an outer cylinder having first and second ends; a sample tube for sliding within the outer cylinder; a tip sleeve mounted to the first end of the outer cylinder; a push pipe which may be mounted to the second end of the outer cylinder to prevent the sample tube from sliding out of the second end; a tapered tip extended out of the tip sleeve and which may be selectively retracted into the push pipe; an end cap having a threaded bore which may be mounted to the second end of the outer cylinder in place of the push pipe; a threaded shaft threaded in the threaded bore; a piston rotatively mounted to one end of the threaded shaft for sliding within the outer cylinder; and a torque transmitting element mounted to the proximal end of the threaded shaft for transferring torque to thread the shaft through the threaded aperture and causing the piston to drive the sample tube out of the outer cylinder.

The system uses the mechanical advantage of a threaded shaft and piston to smoothly and gently push the soil sample tubes out of the cylinder. The system is portable, simple, and may be motorized. The piston and shaft may each have a conically shaped surface to provide a bearing interface that facilitates rotation of the piston with respect to the threaded shaft so that the piston does not apply any torque to the soil sample.

BRIEF DESCRIPTION OF THE DRAWINGS

FIG. 3 shows the sample tube ejection assembly mounted to the outer cylinder and the piston engaged to push the soil filled inner tubes out of the outer cylinder.

FIG. 5 shows an end view of the torque transmitting element mounted to the proximal end of the threaded shaft.

FIG. 6 shows the torque transmitting element welded to the shaft end.

FIG. 7 is a cross-sectional view of the soil sample core system showing how the piston drives the sample tubes from the outer cylinder.

Throughout the figures, like references refer to like elements.

DESCRIPTION OF THE PREFERRED EMBODIMENT

Figure 1:
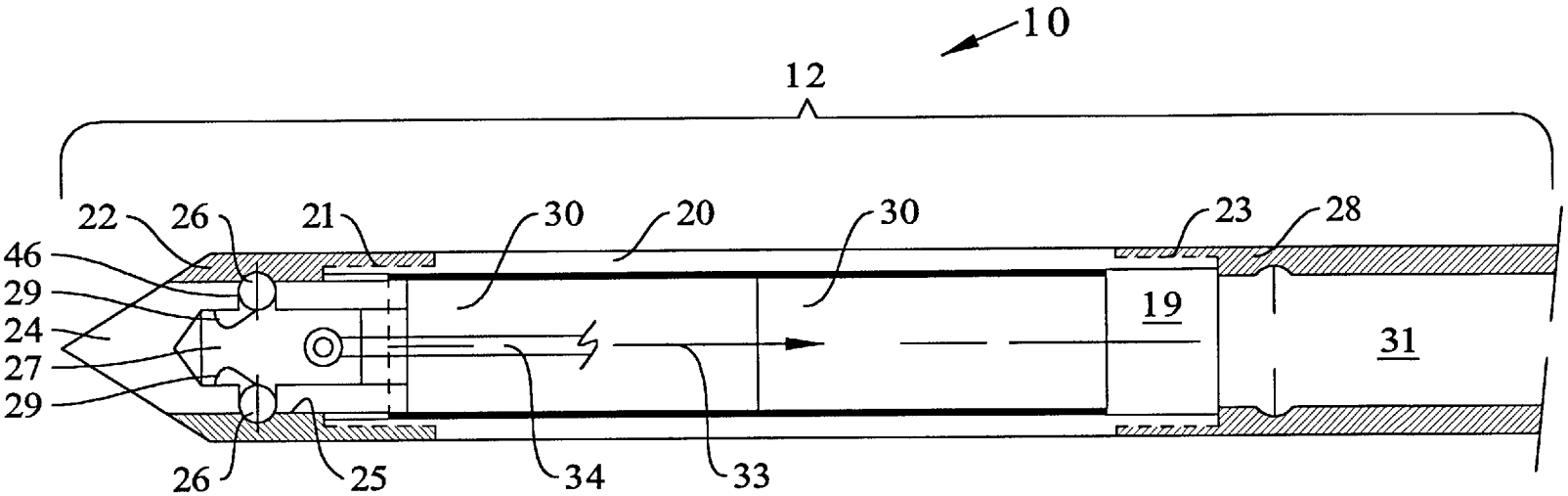
FIG. 1 shows a cross-sectional view of a soil sample core system embodying various features of the present invention which shows the tapered tip locked in the extended position.
Figure 2:
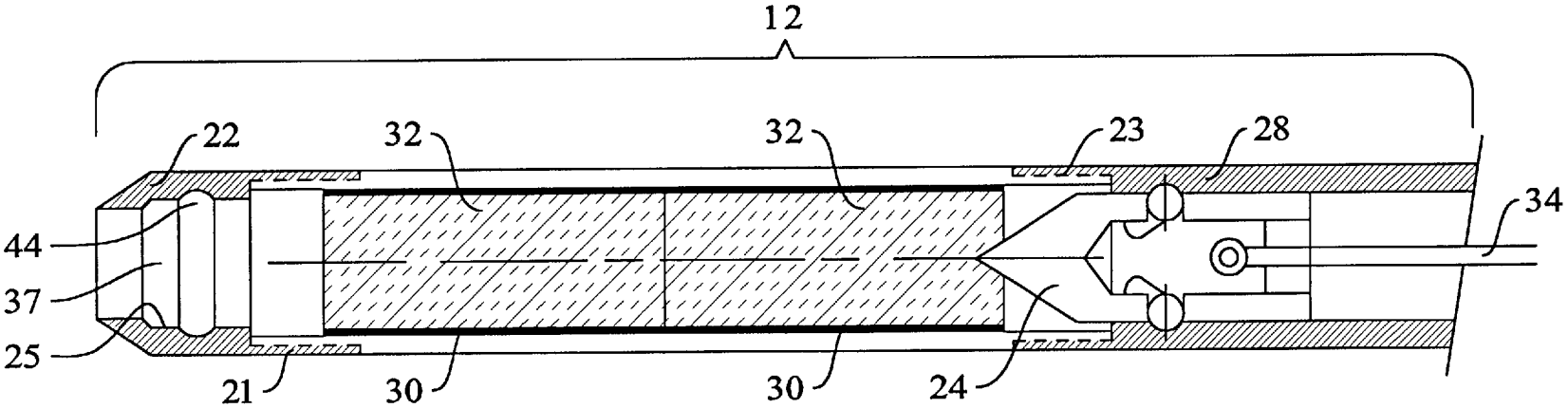
FIG. 2 is a cross-sectional view of the soil sample core system showing the tapered tip retracted in the push pipe.

Referring to FIGS. 1 and 2, the present invention provides a soil sample core system 10 by which subterranean soil samples 32 may be retrieved and then easily ejected from the system without being damaged. Referring to FIGS. 1 and 2, the system 10 incorporates a soil sampling tool 12, such as a Van Den Berg, Inc. MOSTAP sampler 35 PS, ART. No. 060050A) which includes an outer cylinder 20 that houses one or more soil sample tubes 30 (two are shown, for example) stacked in series and a retractable tip 24 extending from one end of the cylinder 20. The outer cylinder 20 has first and second threaded ends 21 and 23, respectively, and a through bore 19. A tip sleeve 22 is screwed to the threaded end 21 and a push pipe adapter 28 is screwed to the other threaded end 23. The push pipe adapter 28 is also threaded (not shown) to receive continuing links of push pipe (not shown) that are used to push the tool 12 to the appropriate depth of interest through the soil. The tip sleeve 22 selectively holds a retractable conically shaped tip 24 fixedly in place so that the tip 24 extends from the tip sleeve 22. The tip sleeve 22 includes an annular groove 44 formed in its inner surface 25. A plunger 27 having radially distributed tapered recesses 29 is positioned within the tip sleeve 22 so that when the recesses 29 are aligned with the groove 44, spherical bearings or balls 26 are held between the groove 44 and recesses 29 to secure the conical tip 24 at the end of the outer cylinder 20.

Once the soil sampling tool 12 is pushed to a depth of interest, the tip 24 may be retracted up inside the tool 12. Retracting the tapered tip 24 is accomplished by pulling aft on a cable 34, attached to the plunger 27, in the direction of arrow 33, causing the balls 26 to be pushed inwardly out of the groove 44 of the tip sleeve 22. Continued pulling on the cable 34 causes the tip 24 to be pulled up through the bore 19 of outer cylinder 20 and into the bore 31 of push pipe adapter 28, as shown in FIG. 2. The tool 12 is now ready to be configured to obtain soil samples.

As the tool 12 is again pushed through the soil, soil samples 32 enter the tip sleeve 22 through bore 37 and fill coaxially aligned soil sample tubes 30 having an outer diameter which allows them to smoothly slide within bore 19 of the outer cylinder 20. FIG. 2 shows the tip 24 retracted within the push pipe adapter 28 and inner tubes 30 filled with soil samples 32. The tool 12 may then be pulled up to the terrestrial surface (not shown) so that the soil samples 32 may be retrieved.

Figure 4:
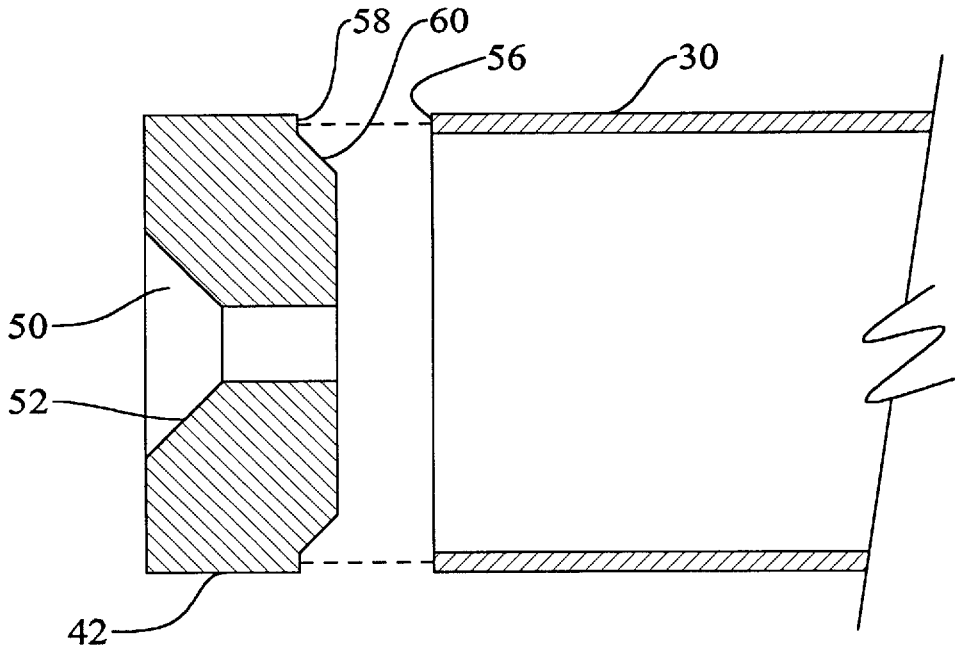
FIG. 4 is a cross-sectional view showing the land at the periphery of the piston engages the sample tube.

In order to configure the soil sample core system 10 so that the soil sample tubes 30 may be ejected from the cylinder 20, the tip sleeve 22 and push pipe adapter 28 are removed from the cylinder 20. Then, the sample tube ejection assembly 35, shown in FIG. 3, is mounted to one end of the cylinder 20. The sample tube ejection assembly 35 includes the end cap 36, a threaded shaft 38 which is threaded through the threaded aperture 39 of the end cap 36, and a piston 42. The distal end of the shaft 38 preferably includes a bearing 41, preferably having a conically shaped surface which may be made of materials such as steel, bronze, brass, copper alloys, or even plastic. The piston 42 includes a recess 50 that provides a bearing surface 52 shaped to fit over the bearing 41 so that the piston 42 may freely rotate with respect to the shaft 38, and an annular land 52, shown in FIG. 4, sized to engage the end 56 of sample tubes 30. Referring also to FIG. 3, the piston 42 may be held in position at the end of the shaft 38 by, for example, a washer 44 and screw 46, although other mechanical retaining systems such as internal or external C-rings. The end cap 36 preferably may have outer hex shape as shown in FIG. 5 so it can be easily tightened onto the cylinder 20. A torque transmitting element 54, such as a hexagonal nut welded, may be mounted onto the proximal end of the threaded shaft 38, as for example by welding, to facilitate rotation of the threaded shaft 38 by the application of torque to the element 54. The forward end of the shaft 38 may contain a hexagonal recess 48, as shown in FIG. 6, for receiving a drive coupling, not shown, so that the shaft 38 may be rotated by a motor driven tool such as a power drill. To counter the rotation of the shaft 38, the end cap 36 can be held in a vice or with a wrench.

The threaded shaft is fully retracted so that the piston 42 may slide into the bore 19 of the cylinder 20 and so that the threaded bore 43 of the end cap 36 may be screwed to one end of the cylinder 20, whereupon the soil sample core system 10 is configured as shown in FIG. 3. As the threaded shaft 38 is rotated by end nut 54, the piston 42 advances in the bore 19 of the outer cylinder 20 so that the annular land 58 of the piston 42 butts up against the end 56 of the soil sample tube 30, thereby forcing the soil sample tube(s) 30 out of the open end 45 of the cylinder 20. The distal end of the piston 42 includes a frustrum shaped, or conically tapered surface 60 which allows the piston 42 to be centered against and within the end of the tube 30 as annular land 58 of the piston 42 drives the tube 30 out of the outer cylinder 20. Without the tapered surface 60, the piston 42 may not be centered against the tube 30, causing the tube 30 to jam within the cylinder 20. Torque applied to the shaft 38 via the torque transmitting element 40 through the end cap 36 provides a large mechanical advantage that readily causes the soil sample tubes 30 to be driven out of the cylinder 20. Although the threaded shaft 38 rotates as it feeds through the end cap 36, the piston 42 does not rotate with respect to the soil sample tubes 30 because the piston 42 is free to rotate about the bearing 41 at the end of the threaded shaft 38. Therefore, the piston 42 does not transfer torque to either the sample tube 30 or soil sample 32. FIG. 7 shows the soil filled sample tubes 30 being pushed out of the cylinder 20 by the piston 42 as the threaded shaft 38 is fed through the end cap 36. After being ejected from the cylinder, the soil sample tubes 30 may be sealed with standard plastic end caps, not shown, and sent to a laboratory for analysis. Thus it may be appreciated that the invention provides a soil sample core system by which soil samples may be retrieved without being compressed or otherwise disturbed.

Obviously, many modifications and variations of the present invention are possible in the light of the above teachings. It is therefore to be understood that within the scope of the appended claims the invention may be practiced otherwise than as specifically described.

I claim:

1. A soil sample core system, comprising:

a soil sampling core assembly which includes:

an outer cylinder having first and second cylinder ends;

a sample tube which slides within said outer cylinder for retrieving a soil sample as said outer cylinder penetrates subsurface soil;

a tip sleeve selectively mounted to said first cylinder end of said outer cylinder;

a tapered tip which extends out of said tip sleeve for facilitating penetration of said outer cylinder to a depth of interest in said subsurface soil, and is retracted through said sample tube and out of said outer cylinder so that soil samples enter said sample tube upon further penetration of outer cylinder into said subsurface soil; and a soil sample retrieving assembly which includes:

an end cap having a threaded bore selectively mountable to said first or second cylinder end of said outer cylinder when said tip sleeve is disassembled from said outer cylinder;

a threaded shaft threaded in said threaded bore and having first and second shaft ends;

a piston rotatively mounted to said second shaft end of said threaded shaft for sliding within said outer cylinder, and having a frustrum shaped surface for centering said piston partially in and against said sample tube; and a torque transmitting element mounted to said first shaft end of said threaded shaft for transferring torque to said threaded shaft so that said piston drives said sample tube out of said outer cylinder.

2. The soil sample core system of claim 1 wherein;

said threaded shaft has a first tapered bearing at said second shaft distal end; and said piston has a second tapered bearing surface for rotatively engaging said first tapered bearing surface so that said piston may rotate with respect to said threaded shaft.

3. The soil sample core system of claim 1 wherein said piston has an annular land for engaging said sample tube.

4. The soil sample core system of claim 1 wherein said torque transmitting element is a nut.

5. The soil sample core system of claim 4 wherein said nut has a recess for receiving a torque driving tool for turning said threaded shaft.

* * * * *